3,310,390
ELECTRICALLY CONDUCTIVE ABRASIVE
BODIES
Aditya K. Nehru, Washington, D.C., and Nam P. Suh, Pittsburgh, Pa., assignors to Corning Glass Works, Corning, N.Y., a corporation of New York
Filed Mar. 27, 1962, Ser. No. 182,739
4 Claims. (Cl. 51—295)

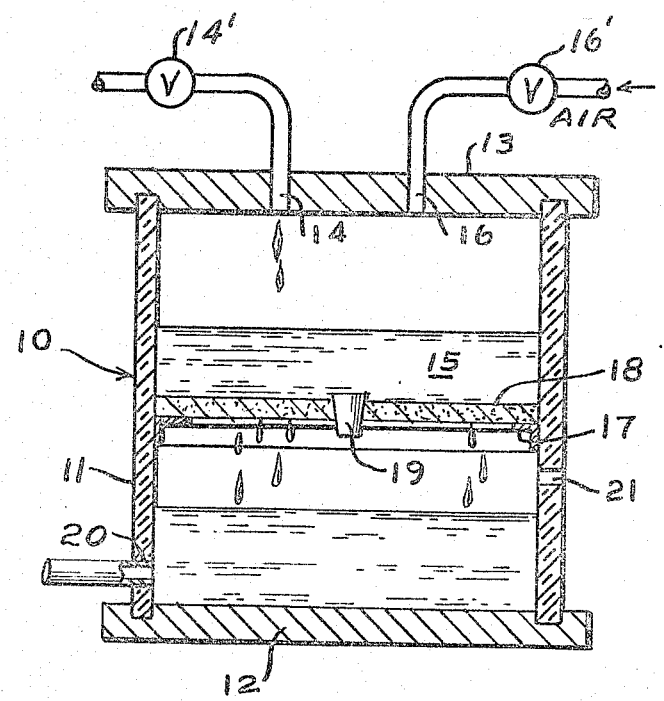

This invention relates to abrasive bodies and more particularly to an improved method of economically producing electrically conductive abrasive bodies utilized in machining.

Among the relatively new machining methods, electrochemical machining has shown definite promise, particularly as the materials requiring machining are becoming harder and more refractory. One form of electrochemical machining is electrically assisted grinding. A typical known set up for such grinding includes a metal bonded diamond wheel, a suitable electrolyte, an electrically conducting workpiece, and a D.C. power supply. Experiments indicate that the work piece is consumed in accordance with Faraday's law, while the diamonds serve to remove the products of reaction in addition to their abrasive function of contributing to the consumption of the workpiece.

Although it has only been the innovation of electrically assisted grinding that has made the grinding and machining of many new refractory materials possible, the present high cost of such machining has materially limited its application. The only electrically conducting abrasive bodies which are presently available are either metal bonded diamond grinding wheels or metal bonded aluminum oxide grinding wheels which both are relatively expensive. For example, such bonded wheels of even relatively small size, may now cost about $100 to $150.

We have devised a new method of economically producing electrically conductive abrasive bodies, such as grinding wheels, at about one-tenth of the cost of the presently available metal bonded wheels. Our invention, however, is not limited to electrically conductive abrasive bodies in the form of a wheel, but may encompass such abrasive bodies in any size or shape which may, by relative movement between such body and a work piece, be utilized to machine the workpiece. Briefly, our invention encompasses the impregnation of inexpensive nonconductive or semiconductive commercially available porous abrasive bodies, which may be in the shape of a grinding wheel, with an electrically conductive substance. Such abrasive bodies may be of any porous composition such as the ordinary nonconductive aluminum oxide, semiconductive silicon carbide, or even the relatively new nonconductive polyvinyl alcohol grinding wheel composition. Wall portions of the interstices and foramina of such porous abrasive bodies may be coated with an electrically conductive material by first catalyzing them and then forcing an electroless plating solution within such openings. By creating a differential in pressure on opposite sides of the body, such as by rapidly moving it within a bath of plating solution or by applying a pressure or vacuum to the appropriate side, the solution may be readily forced completely through the body to thoroughly impregnate it with the electrically conductive material.

It thus has been an object of our invention to provide a new and improved method of economically producing electrically conductive abrasive bodies.

A further object of our invention has been to produce an inexpensive electrically conductive tool, grinding wheel, or the like by impregnating an abrasive relatively non-conducting porous body with an electrically conductive substance.

These and other objects of our invention will be more apparent to those skilled in the art from the following disclosure and accompanying drawing, in which a somewhat schematic diagram illustrating apparatus that may be utilized in a method embodying our invention is shown.

As is known in the prior art, a metal may be deposited from solution onto a metallic surface without the application of an external current. However, by utilizing electroless plating solutions, a metal may also be deposited on an originally non-metallic surface which has been suitably catalyzed. Generally porous grinding wheels have low conductivity, being either non-conductors or relatively poor conductors, and are usually made of non-catalytic materials. Accordingly, if such a wheel is to be utilized as an initial abrasive body, it is necessary to first catalyze all of its surface and wall portions to be plated, with a suitable catalyst such as palladium. Thus by coating such non-catalyzed surfaces with palladium from, for example, an aqueous palladium chloride and hydrochloric acid solution, metals such as copper, nickel, cobalt, gold and perhaps other metals may be electrolessly deposited on such surfaces from solutions containing these metals as ions.

Although we prefer to utilize the electroless copper plating solutions to impregnate and coat relatively dielectric or non-conducting porous abrasive bodies such as grinding wheels, due to the high electroconductivity of the resulting deposit, it is within the purview of our invention that other electroless plating solutions, such as nickel or cobalt, may be utilized. We have found, however, that certain electrolytic solutions chemically attack the copper within the interstices of the copper impregnated wheel rendering it nonconductive, and where the use of these electrolytes is contemplates, it is advisable to further impregnate and coat the surface of such copper impregnated wheels with a small amount of nickel to prevent such chemical attack on the copper. Although representative examples of electroless plating solutions are given throughout the application, they are by no means limiting and virtually any of the various commercially available electroless plating solutions may be utilized.

Since the procedure for impregnating any porous non-conducting or semiconducting abrasive body with any of the above-mentioned electroless plating solutions is similar, only the procedure for copper impregnation of porous grinding wheels will be described. Initially the grinding wheels are relatively porous, however, once the copper particles begin depositing on the wheel, the exterior-most passages and interstices begin to become clogged and a differential in pressure between opposite sides of the wheel is necessary to force the solution therethrough. Although a rapid movement of the wheel through the impregnating solution tends to force the solution through the wheel, we prefer to maintain the wheel in a stationary position and create a pressure differential on opposite sides thereof by either utilizing a positive super-atmospheric pressure to force the solution therethrough, or a vacuum or negative sub-atmospheric pressure to draw the solution through the wheel. To accomplish this end, an impregnator such as schematically shown in the drawing was devised.

In its simplest form the impregnator 10 comprises a cylindrical body 11, a bottom plate 12 and a top closure member 13. The closure member 13 is provided with an orifice 14 for introducing the electroless plating solution 15, and an opening 16 for providing gaseous fluids under pressure. Suitable valves 14' and 16' may be utilized to control the flow through the openings 14 and 16, respectively. The bottom plate 12 and top closure member 13 are maintained in a hermetically sealed relationship with the cylindrical body 11 by any suitable means.

Any suitable means such as supporting rim 17 is provided for positioning a porous relatively nonconductive grinding wheel 18 which is to be impregnated, intermediate the upper and lower end portions of the cylindrical body 11. The edge or rim portions of the wheel 18 are preferably sealed by means of suitable washers or gaskets to prevent the leakage of the solution 15 between the edge of the wheel and inner surface of the cylinder 11. Also the center hole of the grinding wheel 18 is provided with a plug or stopper 19 to prohibit the passage of fluid therethrough.

A drain opening 20 is provided adjacent the lower end of the cylinder 11 to drain off the solution which has passed through the wheel for recycling. In addition, a vent opening 21 is positioned within the sidewall of the cylindrical body 11 below the supporting rim 17 to provide an exit for the pressurized gases supplied at the opening 16 for forcing the solution 15 through the wheel 18. If desired, a vacuum may be applied at the opening 21 to draw the solution 15 through the wheel 18, in which case the orifice 16 would be open to the atmosphere.

In operation our improved method may be broken down into three main phases which include a cleaning process, a catalyzing and accelerating process, and an impregnating process. The cleaning process may be accomplished by either agitating a wheel for about 15 minutes within about a 30% to 50% HCl solution, or by passing such solution through the wheel, utilizing the apparatus shown in the drawing.

The wheel is then catalyzed by passing suitable catalyzing solution therethrough, again utilizing apparatus similar to that shown in the drawing. A typical catalyst which may be utilized for such purpose and which can readily be made by combining palladium chloride solution and hydrochloric acid may contain about .02 gram per liter of palladium and about 20 milliliters per liter of HCl in water. About a liter of such cataylst may be repeatedly cycled through the wheel for about 20 to 25 minutes. The solution flows through the wheel quite easily and there is no need for air pressure, however, an occasional pulse of pressure is useful to ensure the complete distribution of the catalyst through the inner interstices of the wheel.

The wheel is then preferably washed with water until there is no visible trace of the catalyst remaining on the wheel. Although not absolutely essential, an accelerator is preferably passed through the wheel for a period of about 10 to 15 minutes. The accelerator speeds the initial deposition of the metal from the electroless bath and helps to prevent catalyst drag-in. Various commercially available accelerators may be utilized, or a simple solution of about 150 grams per liter solution of sodium hypophosphite ($NaH_2PO_2 \cdot H_2O$) may be used. This solution also readily flows through the wheel without requiring air pressure. However, an occasional blast or pulse of pressure is deemed to be helpful in assuring complete penetration. The wheel is then again thoroughly washed with water, preferably of the distilled variety.

A solution on the order of an electroless copper plating solution is then passed through the grinding wheel for a period of about 1 hour. At first the solution will trickle through the wheel, however, as time progresses it must be forced therethrough. If a differential in pressure is not applied on the opposite sides of the wheel, it will not be thoroughly impregnated with copper, but merely be provided with outer surface coating. Fresh solution should be used from time to time as the old solution becomes weaker and used up. At the end of the impregnating cycle the wheel is not only well impregnated with copper, but also has a copper surface coating thereon. A representative electroless copper plating solution which may be utilized during the impregnation cycle is as follows:

| | | |
|---|---|---|
| Water | liter | 1 |
| Potassium sodium tartrate | gm | 94.1 |
| Copper sulfate | gm | 28.4 |
| Sodium hydroxide | gm | 37.4 |
| Sodium carbonate | gm | 31.2 |
| 37% formaldehyde | cc | 30 |

The grinding wheel produced by the above process, being thoroughly impregnated with copper, is highly conductive. However, when such a wheel is utilized with certain salt or acid bath electrolyte solutions, the solution seeps into the wheel, reacts with the copper therein, and renders the wheel nonconducting. Therefore, where the wheel is to be utilized with such electrolyte solutions, we have found it advantageous to partially impregnate and coat the copper impregnated wheel with nickel, and thereby inhibit the corrosive attack of the copper by the electrolyte.

To further impregnate the copper impregnated wheel with nickel, a suitable electroless nickel plating solution such as a hot nickel solution at about 210° F. should be immediately forced through the wheel before the copper surface has an opportunity to oxidize. The nickel plating process is much slower than the copper impregnation cycle, and only a thin coating and impregnation of nickel is produced after subjecting the wheel to the nickel solution for about an hour. A further protective coating of nickel may be applied to the wheel by removing it from the impregnator and placing it in a hot nickel solution bath. The pH of the solution must be kept at about 6.5 with constant additions of strong sodium hydroxide solution, since with the lower pH values of about 5.5 the reactions deplate the nickel off of the wheel, whereas with higher values of about 7, the nickel spontaneously deposits out of the solution as a cloud of gray powder. The nickel may be deposited electrolytically on the copper impregnated wheel using a current, which of course would be much faster than the electroless method. After plating with nickel, the wheel is again washed and allowed to dry.

The following representative electroless nickel plating solution may be used in the foregoing nickel plating process:

| | | |
|---|---|---|
| Nickel chloride ($NiCl_2 \cdot 6H_2O$) | gm./l | 16.04 |
| Soduim hypophosphite ($NaH_2PO_2 \cdot H_2O$) | gm./l | 23.86 |
| Glycine (aminoacetic acid) ($NH_2CH_2COOH$) | gm./l | 5.07 |
| Malic acid ($C_4H_6O_5$) | gm./l | 27.15 |
| $Pb^{++}$ ($PbCl_2$) | gm./l | $4 \times 10^{-3}$ |
| Initial pH of solution (adjusted by addition of NaOH) | | 6.5 |
| Bath temperature, 210° F. at 1 atm. | | |

Although we have disclosed our preferred embodiment of economically producing an inexpensive electrically conducting grinding wheel, various changes and modifications may be made thereto by those skilled in the art without departing from the spirit and scope of our invention as defined in the appended claims.

What is claimed is:

1. An improved electrically conductive grinding wheel comprising, a porous abrasive body portion having low electroconductivity, a first coating of electrically conductive copper material electrolessly deposited on surface portions of interconnected foramina of said porous body portion and extending completely therethrough to form a plurality of continuous electrically conductive paths, and a second coating of electrically conductive nickel material formed on the outer surfaces of said porous body portion to protect the first electrically conductive material from corrosive attack.

2. An improved process for producing electrically conductive grinding wheels from porous abrasive bodies comprising the steps of supporting such a porous abrasive body adjacent an outer peripheral edge, passing a cleaning solution through such porous abrasive body, then catalyzing the inner surface wall portions of such porous abrasive body by passing a catalyzing solution through the pores and interstices of the body, flooding one side of said porous abrasive body with an electroless plating solution while maintaining the opposite side exposed to air, impregnating the porous abrasive body with the electroless plating solution by creating a differential atmospheric pressure on opposite sides of such body to facilitate passage of such plating solution completely through the porous body, and depositing an electrically conductive metallic coating on the catalyzed inner wall surfaces as the electroless plating solution is passed through the porous body to form a plurality of electrically conductive paths completely therethrough.

3. An improved process as defined in claim 2 wherein said cleaning solution contains HCl and said plating solution contains copper ions.

4. An improved process as defined in claim 2 wherein a greater atmospheric pressure is supplied to the flooded side of said abrasive body than the opposite side to facilitate the flow of the plating solution completely therethrough to form an electrically conductive grinding wheel.

References Cited by the Examiner

UNITED STATES PATENTS

| | | | |
|---|---|---|---|
| 1,959,059 | 5/1934 | McGill | 51—295 |
| 2,052,194 | 8/1936 | Sandorff | 51—296 |
| 2,070,679 | 2/1937 | Pebock et al. | 204—30 |
| 2,454,610 | 11/1948 | Narcus | 204—30 |
| 2,835,630 | 5/1958 | Huddle et al. | 204—38.2 |
| 2,884,344 | 4/1959 | Ramirez | 106—1 |
| 3,093,464 | 6/1963 | Coes | 51—295 |

ALEXANDER H. BRODMERKEL, *Primary Examiner.*

LESLIE H. GASTON, MORRIS LIEBMAN,
*Examiners.*

D. J. ARNOLD, *Assistant Examiners.*